United States Patent [19]

Fitzpatrick et al.

[11] 4,405,785

[45] Sep. 20, 1983

[54] VAT DYESTUFF PREPARED FROM CRUDE ANTHRAQUINONE MIXTURES

[75] Inventors: Joseph W. Fitzpatrick; Harold N. Schmidt, both of Toms River, N.J.

[73] Assignee: Toms River Chemical Corporation, Toms River, N.J.

[21] Appl. No.: 197,371

[22] Filed: Oct. 15, 1980

Related U.S. Application Data

[60] Continuation of Ser. No. 11,477, Feb. 12, 1979, abandoned, which is a continuation of Ser. No. 808,579, Jun. 21, 1977, abandoned, which is a continuation of Ser. No. 559,451, Mar. 18, 1975, abandoned, which is a division of Ser. No. 346,544, Mar. 30, 1973, Pat. No. 3,917,640.

[51] Int. Cl.³ ............................................. C09B 5/40
[52] U.S. Cl. .................................................. 546/30
[58] Field of Search ....................................... 546/30

[56] References Cited

U.S. PATENT DOCUMENTS

| | | | |
|---|---|---|---|
| 1,052,507 | 2/1913 | Neresheimer | 546/59 |
| 2,456,589 | 12/1948 | Lytle | 546/30 |
| 3,008,962 | 11/1961 | Torre | 546/30 |
| 3,418,321 | 12/1968 | Gordon et al. | 546/30 |

*Primary Examiner*—Paul M. Coughlan, Jr.
*Attorney, Agent, or Firm*—Edward McC. Roberts

[57] ABSTRACT

Useful vat dyestuffs can be prepared by reacting a mixture of aminoanthraquinones containing 65-80% 1-aminoanthraquinone and 20-35% of a mixture containing 2-aminoanthraquinone and 1,5- and 1,8-diaminoanthraquinones with, for example, a halogenated benzanthrone or anthraquinone. The mixture of aminoanthraquinones can be obtained by nitrating anthraquinone in sulfuric acid and thereafter reducing the resulting nitroanthraquinones.

3 Claims, No Drawings

VAT DYESTUFF PREPARED FROM CRUDE ANTHRAQUINONE MIXTURES

This application is a continuation of application Ser. No. 011,477, filed Feb. 12, 1979, now abandoned, which is a continuation of application Ser. No. 808,579, filed June 21, 1977, now abandoned, which is a continuation of application Ser. No. 559,451, filed March 18, 1975, now abandoned, which is a division of application Ser. No. 346,544, filed March 30, 1973, now United States patent No. 3,917,640, issued November 4, 1975.

BACKGROUND OF THE INVENTION 1-aminoanthraquinone is a key ingredient in the manufacture of a large number of dyestuffs, particularly vat dyestuffs. According to prior art teachings, it is desirable to obtain the 1-aminoanthraquinone in as pure a state as possible, since the isomeric aminoanthraquinones and diaminoanthraquinones are regarded as undesirable impurities having an adverse effect on the quality of dyestuffs containing any appreciable amount thereof. The desirability of obtaining pure 1-aminoanthraquinone and the difficulty involved in the preparation of this compound in substantially pure form are illustrated in U.S. Pat. Nos. 2,874,168 and 2,302,729. That a technically satisfactory method of preparing mononitroanthraquinone was not available as of 1949 can be seen from "Fundamental Processes of Dye Chemistry" by Fierz-David and Blangley, Interscience Pub. 1949, at pages 57 and 58.

One synthetic route for making high quality 1-aminoanthraquinone is to sulfonate anthraquinone in the presence of mercury catalyst to obtain the anthraquinone-1-sulphonate and thereafter replace the sulfo group by an amino group by reacting the anthraquinone-1-sulphonate with ammonium hydroxide in the presence of nitrobenzenesulphonic acid at elevated temperatures. The product is of acceptable quality but the mercury catalyst presents the problem of disposing of a mercury-contaminated reaction medium, which disposal problem is attended by rather serious ecological considerations. Thus, one desirous of preparing 1-aminoanthraquinones is faced with two horns of a dilemma. In order to obtain good quality 1-aminoanthraquinones, it is necessary to use a route that results in an unacceptable environmental impact. On the other hand, one desirous of avoiding the use of catalytic mercury, who therefore attempts a different route, is confronted by the general teaching of the literature that direct nitration is an unsatisfactory method. In fact, the nitration of anthraquinone in the presence of sulfuric acid results in a mixture of isomers from which the separation of 1-nitroanthraquinone is difficult and expensive.

DESCRIPTION OF THE INVENTION

It has now been found that useful vat dyestuffs can be prepared from a mixture of aminoanthraquinones such as is obtained by nitrating anthraquinone in the presence of sulfuric acid and thereafter reducing the same without purification. The product typically is a mixture of aminoanthraquinones containing 65-80% of 1-aminoanthraquinone and correspondingly 20-35% of a mixture containing some unchanged anthraquinone, 2-aminoanthraquinone and 1,5- and 1,8-diaminoanthraquinones. This mixture of aminoanthraquinones, predominating in 1-aminoanthraquinone and containing substantial amounts of the isomeric 2-aminoanthraquinones and diaminoanthraquinones can be used to replace the more pure 1-aminoanthraquinone normally employed in the manufacture of a variety of vat dyestuffs. As used herein, the terms "mixed aminoanthraquinones" and "mixture of aminoanthraquinones" refer to a mixture of aminoanthraquinones containing from 65-80% of 1-aminoanthraquinone and correspondingly 20-35% of a mixture containing 2-aminoanthraquinone, 1,5-diaminoanthraquinone and 1,8-diaminoanthraquinone. The terms "more pure 1-aminoanthraquinone" and "substantially pure 1-aminoanthraquinone" refer to the commercial 1-aminoanthraquinone that is usually approximately 98% pure 1-amino anthraquinone.

The discovery that the mixed anthraquinones can be used to replace the more pure 1-aminoanthraquinone is surprising and altogether unexpected, first, in view of the consistent teaching by prior artisans respecting the requirement that substantially pure 1-aminoanthraquinone be used as the vat dyestuff intermediate; second, the discovery that the vat dyestuffs obtained herein have greater affinity for certain textiles, such as polyester/cotton blends, than do the corresponding dyestuffs prepared with substantially pure 1-aminoanthraquinone; third, the discovery that in the manufacture of vat dyestuffs substantially pure 1-aminoanthraquinone can be replaced on a 1:1 basis with the mixed aminoanthraquinones, whereby is obtained not only substantially the same quantitative yield of dyestuff, but a dyestuff that provides the same or better dyeing strengths at the same dyestuff levels. These propositions are completely inconsistent with the teachings of the prior art and are altogether surprising.

The dyestuffs obtained herein are vat dyestuffs and as such are useful on all substrates wherein vat dyestuffs normally find utility. The dyestuffs obtained herein are especially useful on cotton and cotton/polyester blends.

The mixed aminoanthraquinones obtained as described herein can be reacted with a wide variety of compounds to yield vat dyestuffs of surprising quality and excellent properties-results that are particularly surprising when it is considered that use of the mixed aminoanthraquinone intermediate is directly contrary to the consistent teaching and practice of the prior art and that the strength of the dyestuffs obtained is equal to or better than that of the dyestuffs obtained with substantially pure 1-aminoanthraquinone.

Thus, the mixed aminoanthraquinones can be reacted with halogenated benzanthrones in the manner of Colour Index Constitution Nos. 69500, 69505, 69510, 69525, 69530, 69535 and 71000; halogenated anthraquinones in the manner of Colour Index Constitution Nos. 65015, 65205, 65215, 65025, 66810, 69005, 69540 and 71050; halogenated phthaloylacridones in the manner of Colour Index Constitution No. 70910; halogenated benzanthronyl sulfides in the manner of Colour Index Constitution No. 60020; aromatic acids or acid chlorides in the manner of Colour Index Constitution Nos. 60515, 60520, 60525, 60530, 65410 and 65429; halogenated pyranthrones and aminoviolanthrones in the manner of Colour Index Constitution No. 65230; anthrapyridones in the manner of Colour Index Constitution No. 68230; aliphatic acids in the manner of Colour Index Constitution No. 65400 and halogenated naphthalenes in the manner of Colour Index No. 66705. The Colour Index Constitution referred to above is the Third Edition, published by the Society of Dyers and Colourists, Copyright, 1971.

In a preferred embodiment, the mixture of aminoanthraquiones is reacted with a halogenated anthraquinone or benzanthrone, or is reacted with a mixture of a halopyranthrone and aminoviolanthrone.

As employed above, "halogenated" refers to chlorinated and/or brominated and includes monohalogenated as well as polyhalogenated derivatives.

As indicated above, one important aspect of this invention is the discovery that mixed aminoanthraquinones can be used to replace substantially pure 1-aminoanthraquinone in the manufacture of vat dyestuffs. This is significant because it permits the elimination of mercury as a catalyst in the synthesis of 1-aminoanthraquinone, thereby obviating a serious ecological problem.

The mixed aminoanthraquinones useful in the present invention can be prepared in any convenient way. A simple and straght-forward route is to nitrate anthraquinone and thereafter to reduce the nitroanthraquinone to aminoanthraquinone.

Nitration of anthraquinone can be conducted in any convenient manner. For example, one can follow the teaching of U.S. Pat. No. 2,874,168 which teaches the nitration of anthraquinone in the cold with nitric acid in the absence of sulfuric acid. Alternatively, one can use the procedure described in U.S. Pat. No. 2,302,729 which teaches that 1-nitroanthraquinone can be produced by direct nitration of anthraquinone in sulfuric acid followed by treatment of the resulting crude 1-nitroanthraquinone with a dilute solution of sodium sulphite. The product obtained by nitrating anthraquinone in the presence of sulfuric acid can be used directly without further treatment. Thus, it is preferred to nitrate anthraquinone in the presence of sulfuric acid, which procedure, as indicated, is well known in the art.

Following preparation of the nitroanthraquinone, the product can be reduced to aminoanthraquinone in any convenient manner, for example by following the procedure described in U.S. Pat. No. 2,874,168, the teaching of which is incorporated herein by reference. Thus, the nitroanthraquinone can be slurried in water and treated with sodium sulfide solution at elevated temperature as described therein. The product is a mixture of mono and diaminoanthraquinones containing 65–80% 1-aminoanthraquinone and correspondingly 20–35% of a mixture containing 2-aminoanthraquinone and 1,5- and 1,8-diaminoanthraquinones.

As indicated, this mixture has been found to yield useful and acceptable dyestuffs when used to replace pure 1-aminoanthraquinone in the manufacture of vat dyestuffs.

EXAMPLE 1

This example illustrates the nitration of anthraquinone and reduction of the nitro compounds to obtain the mixed aminoanthraquinones.

A reaction vessel adapted with an agitator, thermometer and vent is charged with 605 parts of 96% $H_2SO_4$ and 104 parts of anthraquinone. The mixture is heated to 40°–45° C. and, when solution is complete, it is cooled to 15° C. while 85 parts of water are added. Thereafter are added a mixture of 77 parts of nitric acid and sulfuric acids containing 50% nitric acid and 50% sulfuric acid together with an additional 45 parts of 96% $H_2SO_4$ gradually at a temperature of 15°–20° C. After addition is complete, the temperature is gradually, over a 3-hour period, raised to 75° C. and maintained there for one additional hour. The nitration mass is thereafter cooled and drowned in water; the precipitate is filtered and washed free of acid with water.

700 parts water and 130 parts of crude nitroanthraquinone are charged to a reaction vessel fitted with a stirrer and thermometer. Once the slurry is uniform, the pH is adjusted to 9.0 to 10.0 and the temperature raised to 75° C. A solution of 110 parts $Na_2S$ in 200 parts water is gradually added, the temperature raised to 100° C. and held for 2 hours after which the temperature is reduced to 70° C. The slurry is filtered, washed until neutral and dried. The product contains 65–80% of 1-aminoanthraquinone and 20–35% of a mixture containing 2-aminoanthraquinone, 1,5-diaminoanthraquinone and 1,8-diaminoanthraquinone.

EXAMPLE 2

An excellent gray vat dyestuff can be prepared by chlorinating benzathrone to a chlorine content of 12 to 14%, condensing the chlorinated benzanthrone with the mixed anthraquinones described herein, and thereafter effecting ring closure by alkali fusion.

Benzanthrone can be dissolved in either sulfuric acid of 85 to 100% strength, or in oleum, and chlorinated with chlorine gas at a slow, steady rate at a temperature between 30° and 35° C. This chlorination is described in U.S. Pat. No. 2,456,589, incorporated herein by reference. During chlorination, samples are taken at frequent intervals and analyzed. Chlorination is terminated when the sample analyzes from 12 to 14% chlorine. The material is then slowly run into cold water with stirring and the chlorinated benzanthrone mixture is filtered, washed acid-free with water and 1% soda ash solution and finally washed alkali-free with water. It is then dried at 65° C.

Eighty parts chlorinated benzanthrone mixture and 72 parts of mixed aminoanthraquinones obtained as in Example 1 are reacted in 750 parts of nitrobenzene containing 64 parts of soda ash, 4 parts of copper powder and 4 parts of iodine. The mixture is heated to boiling and carbon dioxide continuously passed over the surface of the liquid. Agitation is continuously maintained and at first a little water and nitrobenzene distilled off. The heating is continued under a gentle reflux at about 210° C. for about 2 hours. Thereupon the nitrobenzene is removed by steam distillation and the product is acidified with hydrochloric acid and boiled for a short time with stirring, followed by filtration and washing of the cake with water and drying.

Ring closure is effected by alcoholic KOH. Thus, a fusion pot fitted with stirrer, thermometer and reflux condenser is charged with 187 parts of methyl alcohol, 375 parts of flaked caustic potash. The charge is then heated to its boiling point and, with stirring, is refluxed at this temperature for several hours. It is thereafter cooled to 140° C. and at this temperature 50 parts of the cake described above are added over a period of a few minutes with good agitation. The mixture is then heated to the boiling point and maintained at this temperature with agitation until reaction is complete. The mixture is then cooled to 110° C. and 325 parts of water are slowly added with vigorous stirring and external cooling. The diluted product is then drowned in sufficient water to make a volume of 3,000 parts. The temperature at this stage is maintained at 50° C. and air is blown through for several hours with continuous agitation until the leuco vat dyestuffs produced by the fusion are all oxidized. This example was repeated using 72 parts of substantially pure 1-aminoanthraquinone; the yield data are as follows:

|  | Mixed Anthraquinones | Substantially Pure 1-aminoanthraquinone |
|---|---|---|
| Parts | 72 | 72 |
| Yield of product (parts) | 147 | 149 |

The dyeing strength of the dyes from the mixed end substantially pure aminoanthraquinone were equivalent. The shades on cotton were also essentially equal.

EXAMPLE 3

A black vat dyestuff can be prepared by condensing bromopyranthrone in nitrobenzene with aminoviolanthrone and the mixed aminoanthraquinones obtained as in Example 1, in the presence of CuO and sodium acetate.

1800 parts of nitrobenzene are charged to a reaction vessel provided with a heater, stirrer and reflux condenser, and the temperature raised to 100° C. at which temperature are added, under agitation, 36 parts of bromopyranthrone, 47 parts of aminoviolanthrone, 23 parts of mixed aminoanthraquinones, 30 parts of sodium acetate and 15 parts of copper oxide powder. The temperature is raised to 210° C. in three hours and the charge refluxed for 18 hours.

At the end of the reaction period, the charge is distilled to dryness in a vacuum. The crude product is acid pasted by dissolving in 96% sulfuric acid and drowning in water, filtering and washing the press cake acid free.

When the example was repeated using 23 parts of substantially pure 1-aminoanthraquinone, the yield was identical:

|  | Mixed Anthraquinones | Substantially Pure 1-aminoanthraquinone |
|---|---|---|
| Parts | 23 | 23 |
| Yield (parts) | 104 | 104 |

The dyeing strength of both dyestuffs was equivalent and the shades on cotton were essentially equal.

EXAMPLE 4

An olive vat dyestuff can be prepared by condensing equimolar amounts of 1-chloroanthraquinone with mixed aminoanthraquinones to form the dianthrimid, nitrating, reducing, benzoylating and thereafter effecting ring closure to obtain the dyestuff having the formula

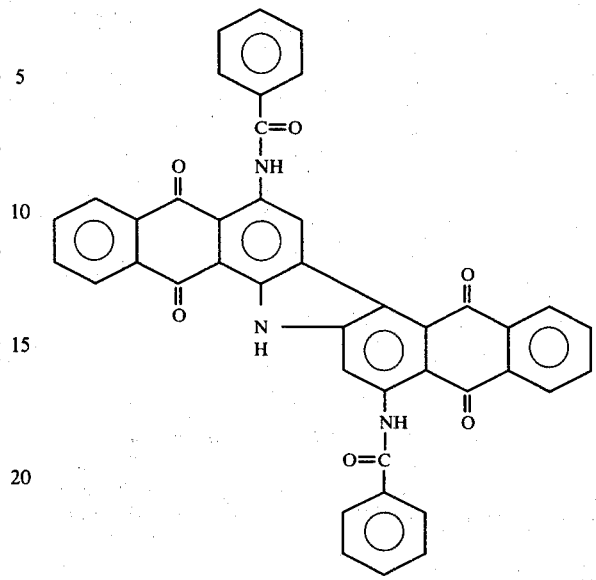

A reaction flask was charged with 400 parts of nitro benzene, 31 parts of 1-chloroanthraquinone, 28 parts of mixed aminoanthraquinones, 15 parts of sodium carbonate and 2 parts of cuprous chloride. The vessel was stirred, heated to 208° to 213° C. and held for 4 to 10 hours. A small amount of nitrobenzene-water mixture was distilled. The reaction mixture was steam-distilled, the product was recovered by filtration, washing neutral with hot water, and drying.

The product obtained above was nitrated as follows: A reaction flask was charged with 390 grams of sulfuric acid 90% to oleum 15%, 18 grams of boric acid was added over about 1 hour and stirred for about 2 hours at 30° to 70° C. to dissolve the boric acid. 55 grams of the reaction product described above was added and the mass cooled to zero to 25° C. About 35 to 40 parts of mixed acid (50% nitric and 50% sulfuric acid) were added over about 4 hours. The mixture was heated to 15° C. and held for about 10 hours at 14° to 40° C. The reaction was drowned into 3,000 parts of water, filtered and washed neutral.

The nitration product was reduced as follows: A reaction flask was charged with 1,500 to 2,000 parts of water, to which was added 65 parts of sodium hydroxide and 53 parts of the nitration product prepared above. 83 parts of sodium sulfide was uniformly added over about 1 hour and the slurry heated to 98° to 100° C. The mass was held at 98° to 100° C. for 2 hours. The mixture was diluted to about 3,500 parts with cold water, filtered, washed with hot water and dried.

Benzoylation and ring closure were effected as follows: A stirred reaction flask was charged with 340 parts of 15 to 25% oleum, 40 parts of the amino compound prepared above and 36 parts of benzoic acid. The mass was heated to 40° to 55° C. and held for 2 to 6 hours. The reaction was cooled to 10° to 20° C. and 70 parts of 78% sulfuric acid and 0.3 parts of hydroquinone were added. The mass was heated to 25° to 35° C., held for 2 hours and then cooled to 10° to 20° C. It was drowned in a solution of 2,000 parts water and 55 parts sodium chlorate. The drowned slurry was heated to 80° C. and held at 80° to 95° C. for 4 to 10 hours. The mass was diluted to about 3,600 parts with water and excess chlorate was decomposed with sodium bisulfite. After filtration and wash, the dye was recovered.

When the above reaction is repeated with substantially pure 1-aminoanthraquinone, the yields are comparable, the dyeing strengths are equivalent and the shades on cotton essentially equivalent.

|  | Mixed Anthraquinones | Substantially Pure 1-aminoanthraquinone |
| --- | --- | --- |
| Parts | 23 | 23 |
| Yield (parts) | 68.5 (approx.) | 70.5 (approx.) |

EXAMPLE 5

An olive vat dyestuff can be prepared by condensing 3-bromobenzanthrone with the mixed aminoanthraquinones followed by caustic fusion to effect ring closure.

A reaction flask was charged with 400 parts nitrobenzene and stirred while 61 parts of 3-bromobenzanthrone, 44 parts of mixed aminoanthraquinones, 20 parts sodium carbonate and 1 part cuprous chloride were added. The stirred slurry was heated to 208° to 213° C. and held 4 to 10 hours. Approximately 5 to 20 parts of nitrobenzene water mixture were distilled. The nitrobenzene was removed by steam distillation and the product recovered by filtration, washing and drying.

Ring closure was effected as follows: A reaction flask was charged with 230 parts of a 50% sodium hydroxide water mixture and 34 parts of 2-ethoxyethanol. The mixture was stirred and heated to 50° to 60° C. and 62 parts of the product obtained above were added. The reaction slurry was then heated to 128° to 132° C., held for 1 to 6 hours and cooled to 50° C. The mixture was drowned into hot water and about 20 parts of 7% sodium hypochlorite was added. The slurry was heated to 90° to 98° C. and stirred 2 to 10 hours. The dyestuff was recovered by filtration, washing and drying.

When this example is repeated using substantially pure 1-aminoanthraquinone, the yield is identical.

|  | Mixed Anthraquinones | Substantially Pure 1-aminoanthraquinone |
| --- | --- | --- |
| Parts | 44 | 44 |
| Yield (parts) | 84 | 84 |

EXAMPLE 6

A gray vat dyestuff can be prepared by condensing 3,9-dibromobenzanthrone with excess mixed aminoanthraquinones followed by caustic fusion to effect ring closure.

A stirred reaction vessel was charged with 360 parts nitrobenzene, 50 parts 3,9-dibromobenzanthrone, 57 parts mixed aminoanthraquinones, 28 parts sodium carbonate and 2 parts cuprous chloride. The slurry was heated to 208° to 213° C. and held 6 to 15 hours. A small amount of nitrobenzene water mixture distills during the reaction period. Nitrobenzene is removed by steam distillation and the product recovered by filtration, washing and drying.

The ring closure was effected by charging a reaction vessel with 340 parts of potassium hydroxide flakes, 24 parts sodium hydroxide, 60 parts of 2-ethoxyethanol. The mixture was heated carefully to 120° to 130° C. and stirring was started when the melt was sufficiently thin. When the melt was smooth, 180 parts of the product obtained above were added while heating to 140° to 145° C. The reaction mass was held 2 to 6 hours at this temperature. 250 parts of a 7% sodium hypochlorite solution were gradually added to the reaction slurry, which was thereafter drowned into 2,500 parts of water and aerated 12 to 24 hours at 25° to 30° C. It was heated to 95° to 100° C. and the product was recovered by filtration and washing to a pH of 6 to 7 with hot water and dried.

When the experiment is repeated using substantially pure 1-aminoanthraquinone, the yields are comparable.

|  | Mixed Anthraquinones | Substantially Pure 1-aminoanthraquinone |
| --- | --- | --- |
| Parts | 57 | 57 |
| Yield (parts) | 83 | 84 |

The dyeing strengths of both dyestuffs are equivalent and the shades of both on cotton are essentially equal.

EXAMPLE 7

A yellow vat dyestuff can be prepared as follows: Into a reaction vessel fitted with a stirrer and thermometer is added 1,500 parts of dry o-dichlorobenzene, 63 parts azobiphenyl-4',4'''-dicarboxylic acid, 1.5 parts pyridine and 53.4 parts thionyl chloride. The mixture was heated to 130° to 135° C. over one hour and held until a clear solution was obtained. Excess thionyl chloride is removed by a current of dry air under reduced pressure.

To the clear solution is added 66.9 parts of mixed aminoanthraquinones prepared as in Example 1 and the mixture heated to 160° to 170° C. for 4 hours and then cooled to room temperature. Two parts soda ash were added, the product filtered and washed with 250 parts of o-dichlorobenzene. The press cake was steam distilled, filtered and washed neutral.

EXAMPLE 8

An olive vat dyestuff can be prepared by condensing 1,4,5,8-tetrachloroanthraquinone with the mixed aminoanthraquinones and thereafter cyclizing the resulting product.

A stirred reaction flask was charged with 1,890 parts of nitrobenzene, 80 parts of 1,4,5,8-tetrachloroanthraquinone, 206 parts of mixed aminoanthraquinones prepared as in Example 1, 60 parts of soda ash and 5 parts of cuprous chloride. The mixture was held at 205° to 210° C. for 24 hours after which time the mixture was steam distilled and the product recovered by filtration, washing neutral with hot water and drying.

Into a reaction vessel were charged 42 parts of the product prepared above, 105 parts of aluminum chloride and 18 parts sodium chloride. Stirring was begun as soon as the melt became sufficiently fluid. The melt was stirred at 150° to 154° C. for 30 minutes and was thereafter drowned into 1,000 parts water. 50 parts of 96% $H_2SO_4$ were added and the slurry was heated and held at 70° C. for 1 hour. The product was filtered and washed to a pH of 4 to 5. The press cake was then slurried in 400 parts of water and 11 parts 50% NaOH solution. The slurry was heated to 55° C. and 120 parts of 10% sodium hypochlorite solution were added and the mixture stirred at 55° to 66° C. until the starch iodide test for hypochlorite was negative. 22 parts of 50% NaOH solution were added and the slurry stirred for another 30 minutes at 55° to 60° C. The product was filtered and washed to a neutral pH.

What we claim is:

1. A process for manufacturing a vat dyestuff comprising the steps of (1) nitrating athraquinone in the presence of sulfuric acid; (2) reducing the crude nitration product from step (1) to give a crude mixture of aminoanthraquinones which is 65-80% 1-aminoanthraquinone with the rest being a mixture of 2-aminoanthraquinone, 1,5-diaminoanthraquinone and 1,8-diaminoanthraquinone; (3) condensing the crude mixture of aminoanthraquinones from step (2) with a halogenated benzanthrone; and (4) ring closing the crude condensate of step (3) to give a vat dyestuff which is of substantially the same shade and dyeing strength as a vat dyestuff obtained by condensing the halogenated benzathrone with substantially pure 1-aminoanthraquinone and ring-closing the resulting condensate.

2. The process of claim 1, wherein the halogenated benzanthrone is chlorinated benzanthrone which contains 12 to 14% chlorine.

3. The process of claim 1 wherein the halogenated benzanthrone is selected from the group consisting of 3-bromobenzanthrone and 3,9-dibromobenzanthrone.

* * * * *